United States Patent
Cheon

(10) Patent No.: US 11,476,907 B2
(45) Date of Patent: Oct. 18, 2022

(54) METHODS AND APPARATUS FOR PROVIDING AN ADAPTIVE BEAMFORMING ANTENNA FOR OFDM-BASED COMMUNICATION SYSTEMS

(71) Applicant: Marvell Asia Pte, Ltd., Singapore (SG)

(72) Inventor: Hyun Soo Cheon, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/378,591

(22) Filed: Jul. 16, 2021

(65) Prior Publication Data

US 2021/0344392 A1    Nov. 4, 2021

Related U.S. Application Data

(63) Continuation of application No. 16/703,764, filed on Dec. 4, 2019, now Pat. No. 11,082,098.

(60) Provisional application No. 62/846,661, filed on May 11, 2019.

(51) Int. Cl.
| | |
|---|---|
| *H04B 7/04* | (2017.01) |
| *H04B 7/0456* | (2017.01) |
| *H04B 7/06* | (2006.01) |
| *H04L 5/00* | (2006.01) |
| *H04L 27/26* | (2006.01) |

(52) U.S. Cl.
CPC ......... *H04B 7/0456* (2013.01); *H04B 7/0617* (2013.01); *H04B 7/0695* (2013.01); *H04L 5/0007* (2013.01); *H04L 27/2607* (2013.01)

(58) Field of Classification Search
CPC .. H04B 7/0617; H04B 7/0456; H04B 7/0695; H04L 5/0007; H04L 27/2607
USPC .......................................... 375/299, 346–348
See application file for complete search history.

(56) References Cited

U.S. PATENT DOCUMENTS

| | | | |
|---|---|---|---|
| 6,992,622 B1 | 1/2006 | Chiang et al. | |
| 10,891,353 B2 | 1/2021 | Zhang et al. | |
| 2004/0252244 A1* | 12/2004 | Bae | H04B 7/088 348/705 |
| 2005/0136980 A1* | 6/2005 | Kim | H01Q 3/2605 455/562.1 |
| 2006/0093055 A1 | 5/2006 | Goldberg | |
| 2007/0198622 A1 | 8/2007 | Jou | |
| 2007/0243831 A1* | 10/2007 | Seki | H04B 7/0417 375/267 |

(Continued)

OTHER PUBLICATIONS

Title: A Blind Spatio-Temporal Equalizer Using Cyclic Prefix in OFDM Systems Author(s): Hyunsoo Cheon, Daesik Hong Published In: 2000 IEEE International Conference on Acoustics, Speech, and Signal Processing. Publisher: IEEE.

*Primary Examiner* — Emmanuel Bayard
(74) *Attorney, Agent, or Firm* — JW Law Group; James M. Wu

(57) ABSTRACT

Methods and apparatus for providing an adaptive beamforming antenna for OFDM-based communication systems. In one embodiment, a method includes forming a matrix (A) of cyclic prefix values and a matrix (B) of tail values from an orthogonal frequency division multiplexed (OFDM) symbol, and forming a summation matrix (S) and a difference matrix (D) from the matrix A and the matrix B. The method also includes multiplying a beamformer preset matrix (W) with the matrix S and the matrix D to determine a matrix (P) and a matrix (Q), and determining a beam identifier from the P and Q matrices.

36 Claims, 6 Drawing Sheets

(56) References Cited

U.S. PATENT DOCUMENTS

| | | | |
|---|---|---|---|
| 2007/0243839 A1* | 10/2007 | Kostic | H04B 7/0413 |
| | | | 455/562.1 |
| 2009/0041150 A1* | 2/2009 | Tsai | H04B 7/0632 |
| | | | 343/893 |
| 2009/0135939 A1 | 5/2009 | Hwang et al. | |
| 2013/0272147 A1 | 10/2013 | Vermani et al. | |
| 2013/0328723 A1* | 12/2013 | Rappaport | H01Q 3/24 |
| | | | 342/372 |
| 2014/0056204 A1* | 2/2014 | Suh | H04W 72/1231 |
| | | | 370/312 |
| 2017/0134964 A1* | 5/2017 | Yu | H04L 1/16 |
| 2017/0366242 A1* | 12/2017 | Lee | H04B 7/0482 |
| 2018/0159600 A1* | 6/2018 | Kim | H04B 7/088 |

* cited by examiner

METHODS AND APPARATUS FOR PROVIDING AN ADAPTIVE BEAMFORMING ANTENNA FOR OFDM-BASED COMMUNICATION SYSTEMS

PRIORITY

This patent application is a continuation patent application of a co-pending U.S. patent application with a Ser. No. 16/703,764, filed on Dec. 4, 2019 in the name of the same inventor and entitled "Methods and Apparatus for Providing An Adaptive Beamforming Antenna for OFDM-Based Communication Systems," which has been issued into a U.S. patent with a U.S. Pat. No. 11,082,098 on Aug. 8, 2021, which further claims the benefit of priority from U.S. Provisional Application No. 62/846,661, filed on May 11, 2019, and entitled "Methods and Apparatus for Providing an Adaptive Beam-Forming Antenna for OFDM-Based Communication Systems," all of which are hereby incorporated herein by reference in their entirety.

FIELD

The exemplary embodiments of the present invention relate to the design and operation of communication networks. More specifically, the exemplary embodiments of the present invention relate to receiving and processing data stream via a wireless communication network.

BACKGROUND

With the rapidly growing trend of mobile and remote data access over high-speed communication networks, such as Long Term Evolution (LTE) or fifth generation (5G) new radio (NR) cellular services, accurately delivering and deciphering data streams has become increasingly challenging and difficult. Such systems have to compensate for multipath transmissions that may have a large path loss.

In 5G NR systems, the importance of beamformers are emphasized, since it is one of the most practical ways to compensate for a large path loss in the ultra-high frequency range. Typically, beam selection for a downlink beamformer is obtained from user equipment (UE) feedback that is received as a channel quality indicator (CQI) for candidate beams transmitted by the NR base station (gNB). Based on the idea that link reciprocity is maintained, the downlink beam selection is regarded as the best one for the uplink beam as well. However, in the presence of one or more interfering signals, link reciprocity may not provide the best beam selection for receiving uplink transmissions.

SUMMARY

In various exemplary embodiments, methods and apparatus are provided for adaptive beam selection to receive uplink transmissions in a wireless communications network. In an embodiment, a cyclic prefix and a tail portion of an OFDM symbol are compared for differences that may occur during transmission. The differences are processed to identify a preset beam pattern to be used to receive uplink transmissions. The embodiments utilize the structure of the OFDM symbol and do not require a signal characteristic normally used for beamformer selection.

In an embodiment, a method is provided that includes forming a matrix (A) of cyclic prefix values and a matrix (B) of tail values from an orthogonal frequency division multiplexed (OFDM) symbol, and forming a summation matrix (S) and a difference matrix (D) from the matrix A and the matrix B. The method also includes multiplying a beamformer preset matrix (W) with the matrix S and the matrix D to determine a matrix (P) and a matrix (Q), and determining a beam identifier from the P and Q matrices.

In an embodiment, an apparatus is provided that comprises a first matrix forming circuit that forms a matrix (A) of cyclic prefix values from a received orthogonal frequency division multiplexed (OFDM) symbol, and a second matrix forming circuit that forms a matrix (B) of tail values from the received orthogonal frequency division multiplexed (OFDM) symbol. The apparatus also comprises a summation circuit that forms a summation matrix (S) from the matrix A and the matrix B, and a difference circuit that forms a difference matrix (D) from the matrix A and the matrix B. The apparatus also comprises a multiplying circuit that multiplies a beamformer preset matrix (W) with the matrix S and the matrix D to determine a matrix (P) and a matrix (Q), and a determination circuit that determines a beam identifier from the P and Q matrices.

Additional features and benefits of the exemplary embodiment(s) of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
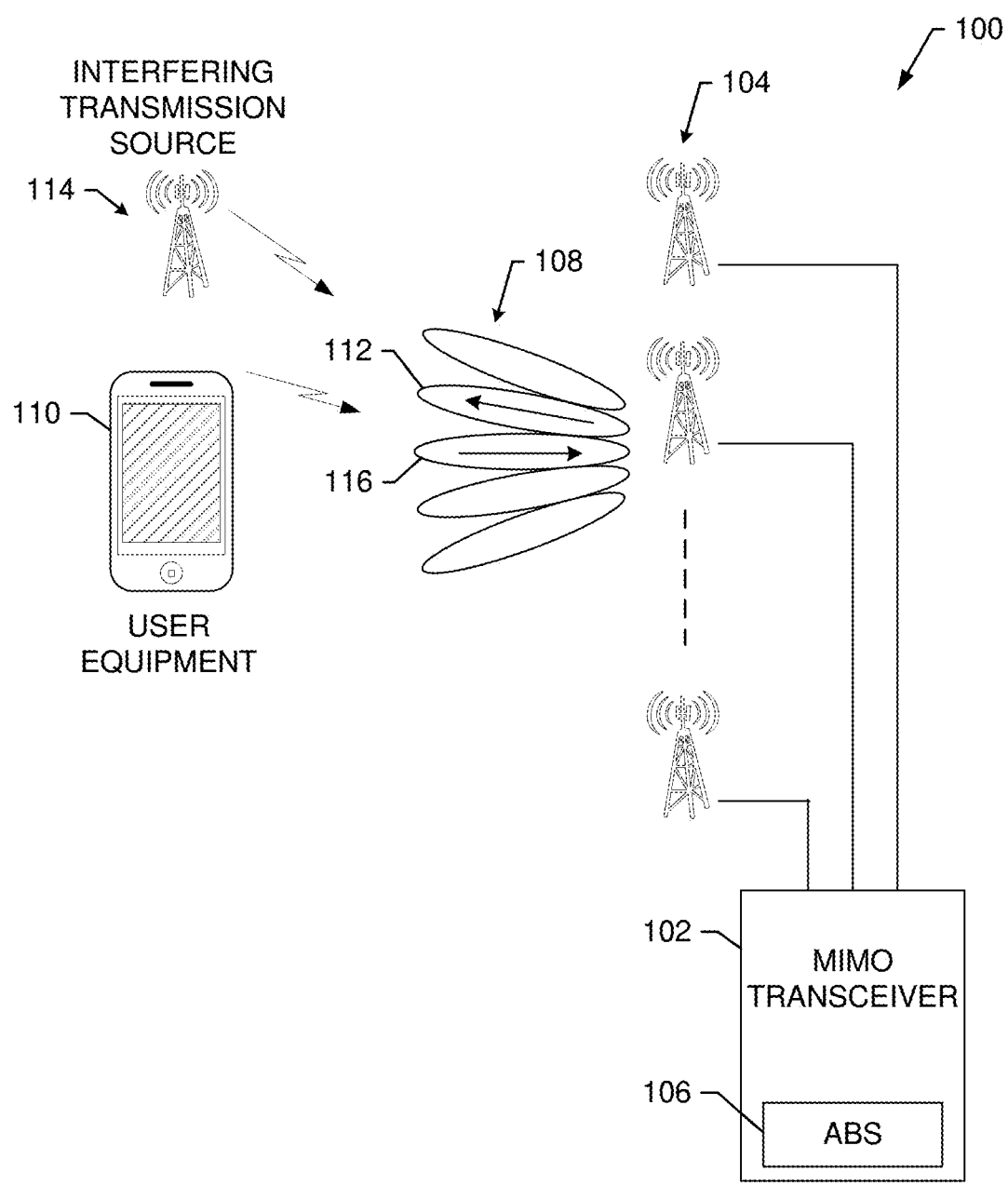
FIG. 1 shows a communication network having a transceiver that includes an exemplary embodiment of an adaptive beam selector that is used to select beam patterns to receive uplink communications.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

Orthogonal frequency Division Multiplexing (OFDM) has been utilized in digital wireless broadcasting and indoor wireless data networks for its multipath mitigation and bandwidth efficiency. In a wireless environment, spatiotemporal diversity can be adopted for performance enhancements. By applying blind approaches that provide spatiotemporal diversity to OFDM systems, higher bandwidth efficiency can also be achieved. Since wireless applications require channel equalizers with fast channel adaptation and tracking ability, it is more favorable to exploit signal structure without knowledge of the received signal statistics. In various embodiments, a blind spatiotemporal equalization algorithm using cyclic prefix in OFDM systems is provided. Instead of using the statistics of the received signal, the signal structure of the OFDM symbol, i.e., cyclic prefix, is exploited. Using a least squares approach, the spatiotemporal equalizer is applied to received signal samples in one OFDM symbol frame. Embodiments of the present invention disclose methods and/or apparatus for adaptive beam selection in a wireless communications network.

FIG. 1 shows a communication network 100 having a MIMO transceiver 102 that includes an exemplary embodiment of an adaptive beam selector (ABS) 106 that is used to select a beam pattern to receive uplink communications. The MIMO transceiver 102 is coupled to a plurality of antennas 104. During downlink transmissions, the MIMO transceiver 102 controls the antennas 104 to transmit information using one or more transmission beam patterns 108. For example, the downlink beam pattern 112 can be formed to transmit downlink information to user equipment 110. The user equipment 110 responds with channel quality information that indicates the quality of the received downlink transmission. The transceiver uses the channel quality information to adjust or select the appropriate beam pattern that is used for downlink transmissions.

However, for uplink transmissions, the beam pattern 112 may not be the best choice. For example, utilizing the beam pattern 112 may result in the reception of interfering signals from interfering transmission source 114. In order to receive uplink transmissions from user equipment 110 while rejecting interfering signals from source 114, the MIMO transceiver 102 utilizes or selects a different beam pattern (such as beam pattern 116) that can receive uplink transmissions from the user equipment 110 while rejecting or attenuating transmissions from the interfering source 114. Therefore, the network 100 operates with multiple beam patterns for both uplink and downlink operations. Since the optimal uplink beam pattern may be different from the optimal download beam pattern, a method for selecting the best beam pattern to use for uplink transmissions is needed.

In an exemplary embodiment, the MIMO transceiver 102 includes the ABS 106 that selects the optimal beam with which to receive uplink transmissions. The ABS 106 determines or selects the best beam pattern to be used to receive uplink transmissions based on analysis of received uplink symbols. A more detail description of the ABS 106 is provided below.

Figure 2:
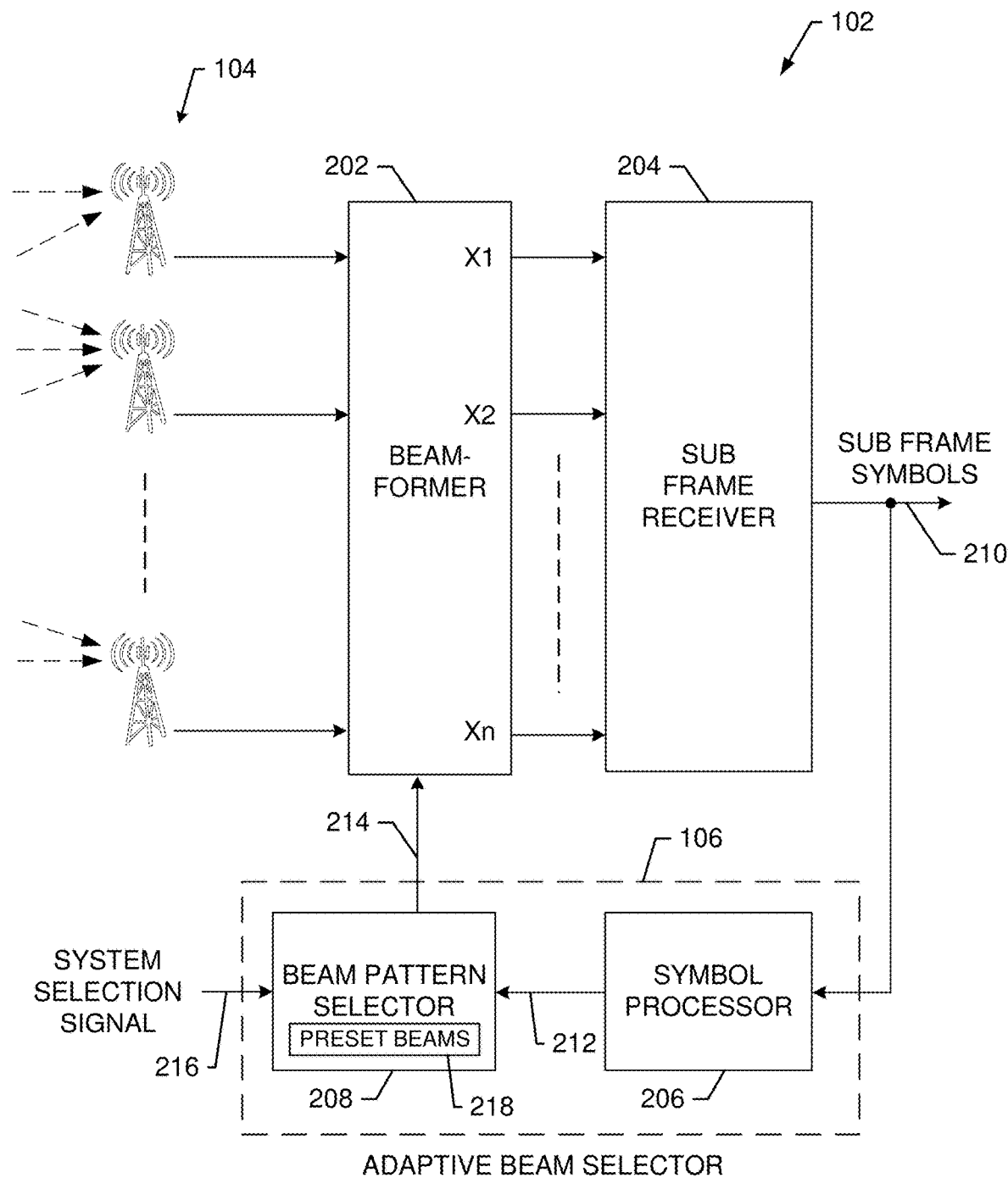
FIG. 2 shows an exemplary detailed embodiment of the adaptive beam selector shown in FIG. 1.

FIG. 2 shows an exemplary detailed embodiment of the transceiver 102 having the adaptive beam selector 106 as shown in FIG. 1. The transceiver 102 comprises beamformer 202, sub-frame receiver 204, and the adaptive beam selector 106. In an embodiment, the ABS 106 comprises a symbol processor 206 and a beam pattern selector 208. The beamformer 202 applies weights to received signals from the antennas 104 according to a beam preset weight signal 214 to form a preset beam pattern that is used to receive uplink transmissions. In an embodiment, the beam pattern selector 208 stores preset beams 218 and outputs the beam preset weight signal 214.

During operation, uplink transmissions are received and processed by the beamformer 202 and the resulting signals are input to the subframe receiver 204. In an embodiment, the beam pattern selector 208 outputs the beam preset weight signal 214 that causes the beamformer 202 to implement a preset beam pattern that is selected from the preset beam patterns 218. The beam pattern selector 208 operates to select a preset beam based on a received system selection signal 216. For example, an initial beam pattern can be selected using the system selection signal 216. The subframe receiver 204 identifies symbols in the sub-frame and outputs the sub-frame symbols 210 to other entities at the transceiver 102. The sub-frame symbols 210 are also input to the ABS 106. The symbol processor 206 receives the sub-frame symbols 210 and processes these symbols in accordance with a beam selection algorithm to determine a preset beam identifier 212 that is input to the beam pattern selector 208. The beam pattern selector 208 uses the preset beam identifier 212 to generate the beam preset weight signal 214 to cause the beamformer 202 to implement one of the preset beam patterns 218. Thus, the uplink beam pattern selection is based on the received symbols. The process is repeated for symbols in each sub-frame so that adaptive beam selection is achieved.

Figure 3:
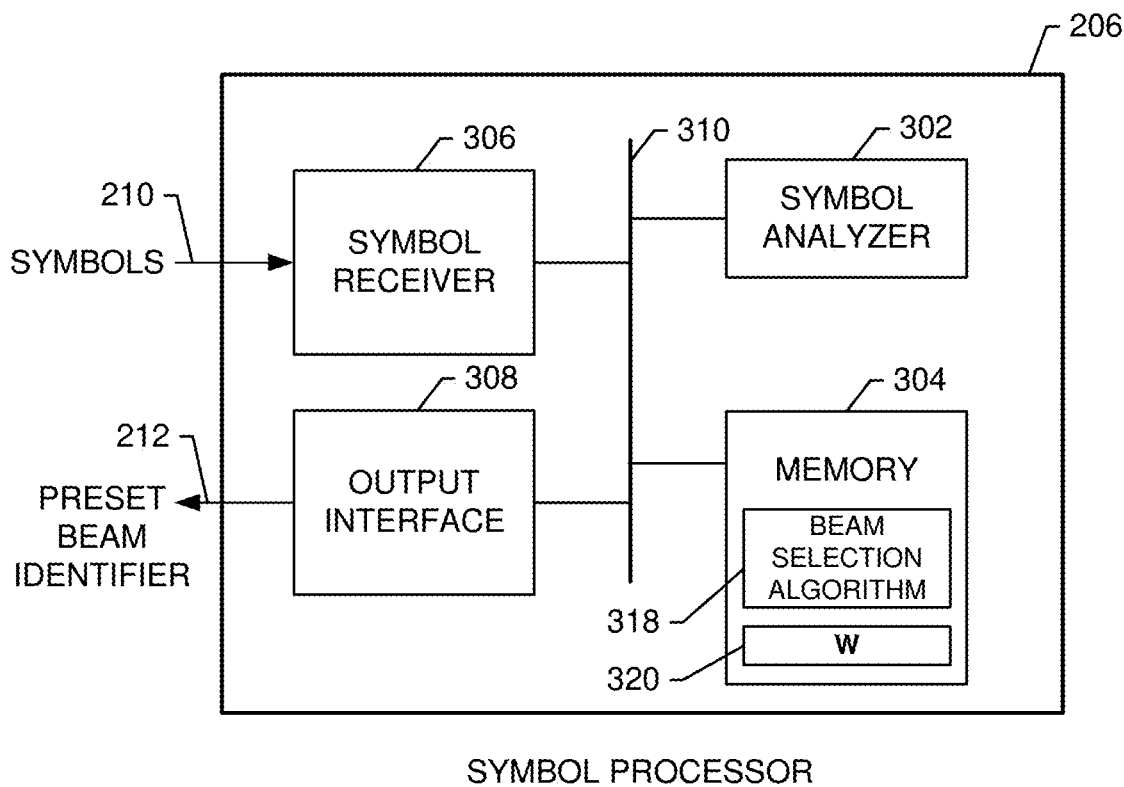
FIG. 3 shows an exemplary detailed embodiment of a symbol processor for use in the adaptive beam selector shown in FIG. 2.
Figure 3:
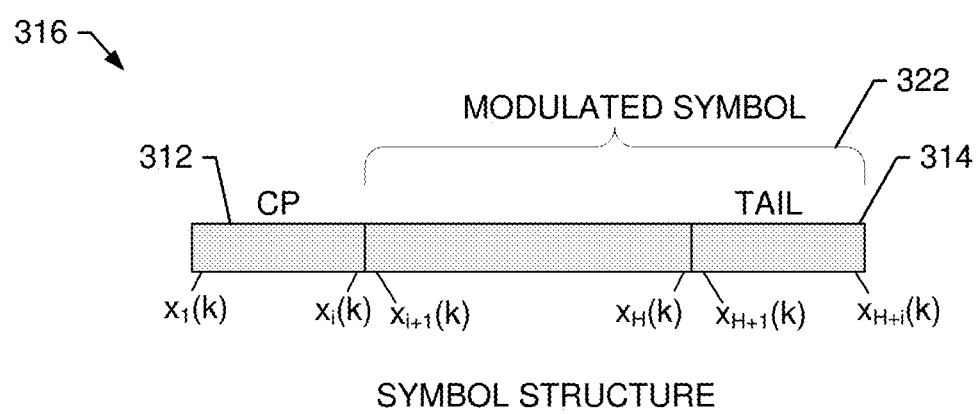

FIG. 3 shows an exemplary detailed embodiment of the symbol processor 206 for use in the adaptive beam selector 106 shown in FIG. 2. In an embodiment the symbol processor 206 comprises symbol analyzer 302, memory 304, symbol receiver 306, and output interface 308 that are all coupled to communicate over bus 310.

During operation the symbol receiver 206 receives symbols 210 that have been received in an uplink transmission from user equipment. For example, the beamformer 202 and the sub-frame receiver 204 process received uplink transmissions to generate the received symbols 210. The symbols are passed to the symbol analyzer 302, which uses the memory 304 when analyzing the symbols. In an embodiment, the memory 304 stores a beam selection algorithm 318 that is used by the symbol analyzer 302 to identify a beam pattern to be used to receive uplink transmissions. The memory 304 also stores a beamformer preset matrix W. After the symbol analyzer 302 determines the preset beam to be selected, the output interface 308 outputs the preset beam identifier 212 to the beam pattern selector 208. A more detailed description of the beam selection algorithm 318 is provided below.

FIG. 3 also shows a received symbol structure 316. The symbol structure comprises a cyclic prefix portion 312 and a modulated symbol portion 322, which includes a tail portion 314. The cyclic prefix portion 312 comprises values $x_i(k)$ to $x_i(k)$. The modulated symbol portion 322 comprises values $x_{i+l}$ to $x_{H+i}(k)$, and the tail portion 314 comprises values $x_{H+l}(k)$ to $x_{H+i}(k)$.

The tail portion 314 and the cyclic prefix portion 312 are identical before transmission. Distortions and/or interference during the transmission may result in differences between the cyclic prefix 312 and the tail portion 314. In various exemplary embodiments, it is these differences that are used to determine the appropriate beam selection.

Beam Selection Algorithm

In various embodiments, a beam selection algorithm is provided for interference-rejecting beam selection for 5G NR and LTE that exploits the OFDM signal structure and can be implemented in both UE and base stations.

In an OFDM communication network, the CP refers to the prefixing of a symbol structure containing a repetition of the tail or end of the symbol. The receiver generally discards the cyclic prefix samples. The cyclic prefix serves two functions, namely, (1) it provides a guard interval to eliminate signal interference from the previous symbol, and (2) the CP repeats the end of the symbol so that a linear convolution of a frequency-selective multipath channel may be modeled using the frequency domain, such as a discrete Fourier transform (DFT). The approach provides simple frequency domain processing, such as channel estimation and equalization.

In an embodiment, the symbol analyzer 302 executes the beam selection algorithm 318 to perform the following operations where the receiver has an antenna array of N elements and M candidate beamformer presets, and the wanted signal transmitted to the receiver is a CP added OFDM(A) signal.

1. Receive the OFDM(A) symbol using N-multiple antennas. The following structural facts of the OFDM(A) symbol and its transmission are exploited by the beam selection algorithm.
A. The cyclic prefix and its original part (e.g., tail of an OFDM(A) symbol) are identical before transmission.
B. The symbol experiences very small time dispersive-ness in higher frequency bands.
C. The channel response is quasi-static within a symbol time.

2. Calculate a summation matrix (S) of a CP matrix (N×$L_{CP}$) and a tail matrix (N×$L_{TL}$), where $L_{CP}=L_{TL}$ (length of the cyclic prefix). The summation matrix S has the following properties.
A. 3 dB better SNR than the normally received signal.
B. Can be used as a reference symbol for beam-finding.

3. Calculate a difference matrix (D) of the CP matrix and the tail matrix. The matrix D contains noise and unwanted signal parts that are not correlated with the wanted signal.

4. Multiply a beamformer preset matrix (W) (e.g., 320) with both the S and D matrices to form P and Q matrices. The beamformer preset matrix W can be expressed as (N×M), where M is the number of preset beams. Thus, for each preset beam (m) there is a set of weights (N) that are applied to the receive antennas to form the particular preset beam pattern.
A. $P=W^H S$ (M×$L_{CP}$), which represents the wanted signal reception.
B. $Q=W^H D$ (M×$L_{CP}$), which represents the unwanted signal reception.

5. Determine the best beamformer present (m) out of the M available presets according to the following:

$$\arg\max_{m \in M} \sum_{l=1}^{L_{CP}} \frac{|w_m^H s_l|^2}{|w_m^H d_l|^2} = \arg\max_{m \in M} \sum_{l=1}^{L_{CP}} \frac{|p_{m,l}|^2}{|q_{m,l}|^2};$$

where $s_l$ and $d_l$ are l-th column vectors of matrices S and D (e.g., $s_{m,l}$ and $d_{m,l}$ are the elements at m-th row and l-th column of the matrices S and D), respectively.

In various exemplary embodiments, the adaptive beam selection methods and apparatus provide the following advantages.
1) Determination of interference rejection beams without knowing the characteristics of the interfering signal (can be implemented in frontend outside of the baseband MODEM).
2) Candidate beams can be verified and refined further in the baseband receiver.
3) Jointly applicable with the existing beamforming techniques.
4) Applicable even in cases where the link reciprocity is not guaranteed (e.g., can be implemented in FDD)
5) Applicable to both base station and user equipment and other OFDM-based communication systems having beamformers.

Thus, in various exemplary embodiments, the adaptive beam selection algorithm exploits the OFDM/SC-FDMA signal structure (cyclic prefix) to determine uplink beam selection, and in OFDMA cases, the algorithm supports frequency-selective interference rejection beamforming.

Figure 4:
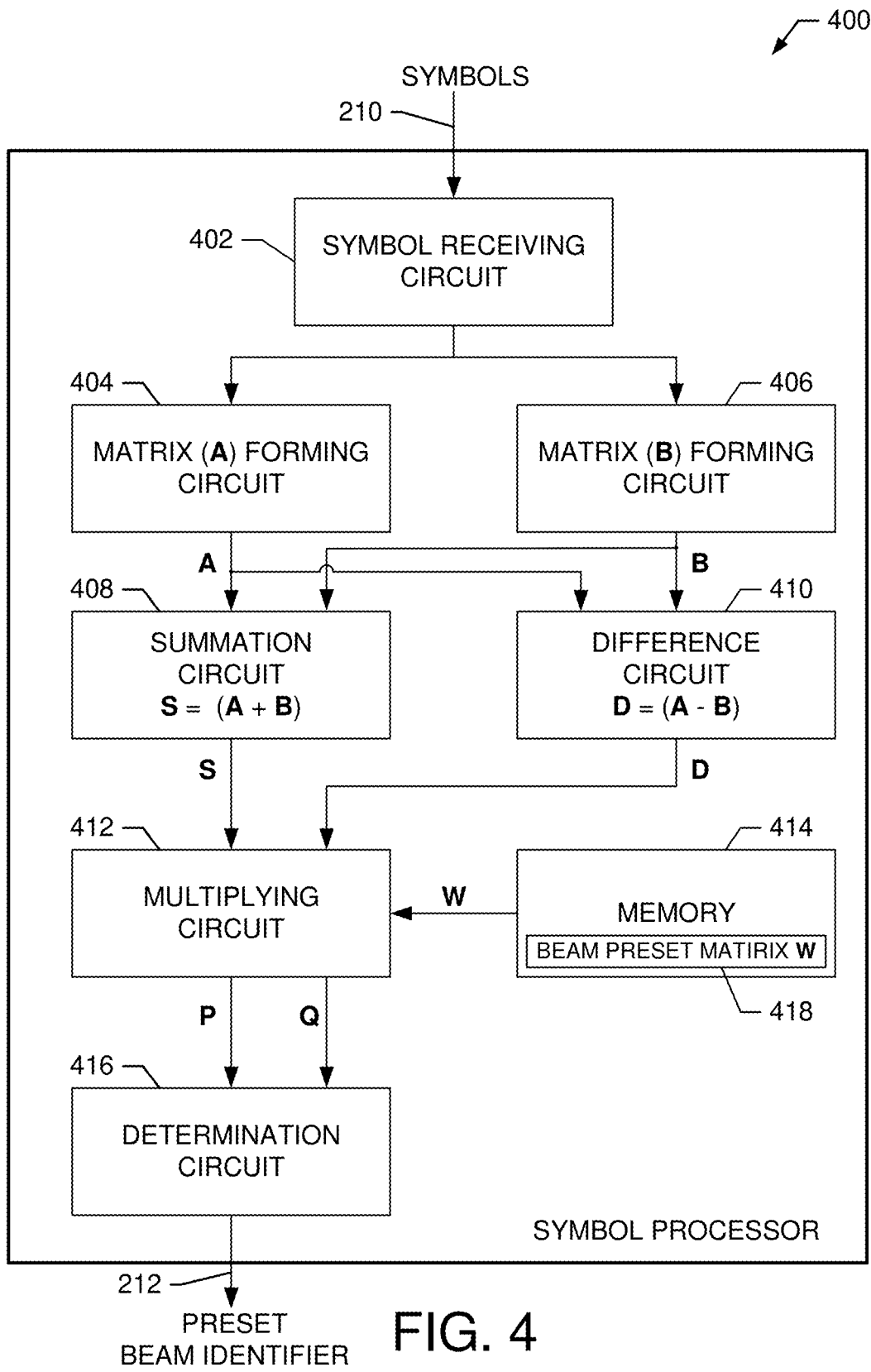
FIG. 4 shows an exemplary detailed embodiment of a symbol processor for use in the adaptive beam selector shown in FIG. 2.

FIG. 4 shows an exemplary detailed embodiment of a symbol processor 400 for use in the adaptive beam selector 106 shown in FIG. 2. In an embodiment, the symbol processor 400 comprises symbol receiving circuit 402, matrix A forming circuit 404, matrix B forming circuit 406, summation circuit 408, difference circuit 410, multiplying circuit 412, memory 414 and determination circuit 416. In an embodiment, each of the circuits of the symbol processor 400 includes selected components selected from components comprising programmable arrays, discrete circuits, memory, registers, logic, control circuitry, and/or other suitable components.

During operation of the symbol receiving circuit 402 receives symbols 210 that have been received in an uplink transmission from user equipment. For example, the beamformer 202 and the sub-frame receiver 204 process received uplink transmissions to generate the received symbols 210. The symbols are input to the matrix A forming circuit 404 that forms matrix A as described above. The symbols also are input to the matrix B forming circuit 404 that forms matrix B as described above. The matrices A and B are input to the summation circuit 408 and the difference circuit 410, which form the summation matrix S and the difference matrix D, respectively. The multiplying circuit 412 receives the S and D matrices and multiples the S and D matrices by the beamformer preset matrix W 418 that is retrieved from the memory 414. The multiplying circuit 412 generates the matrices P and Q as described above. The determination circuit 416 receives the P and Q matrices and determines the optical beam pattern to use that is output as the preset beam identifier 212. Thus, the symbol processor 400 processes received symbols to determine the optimal beam pattern for use in receiving uplink communications.

Figure 5:
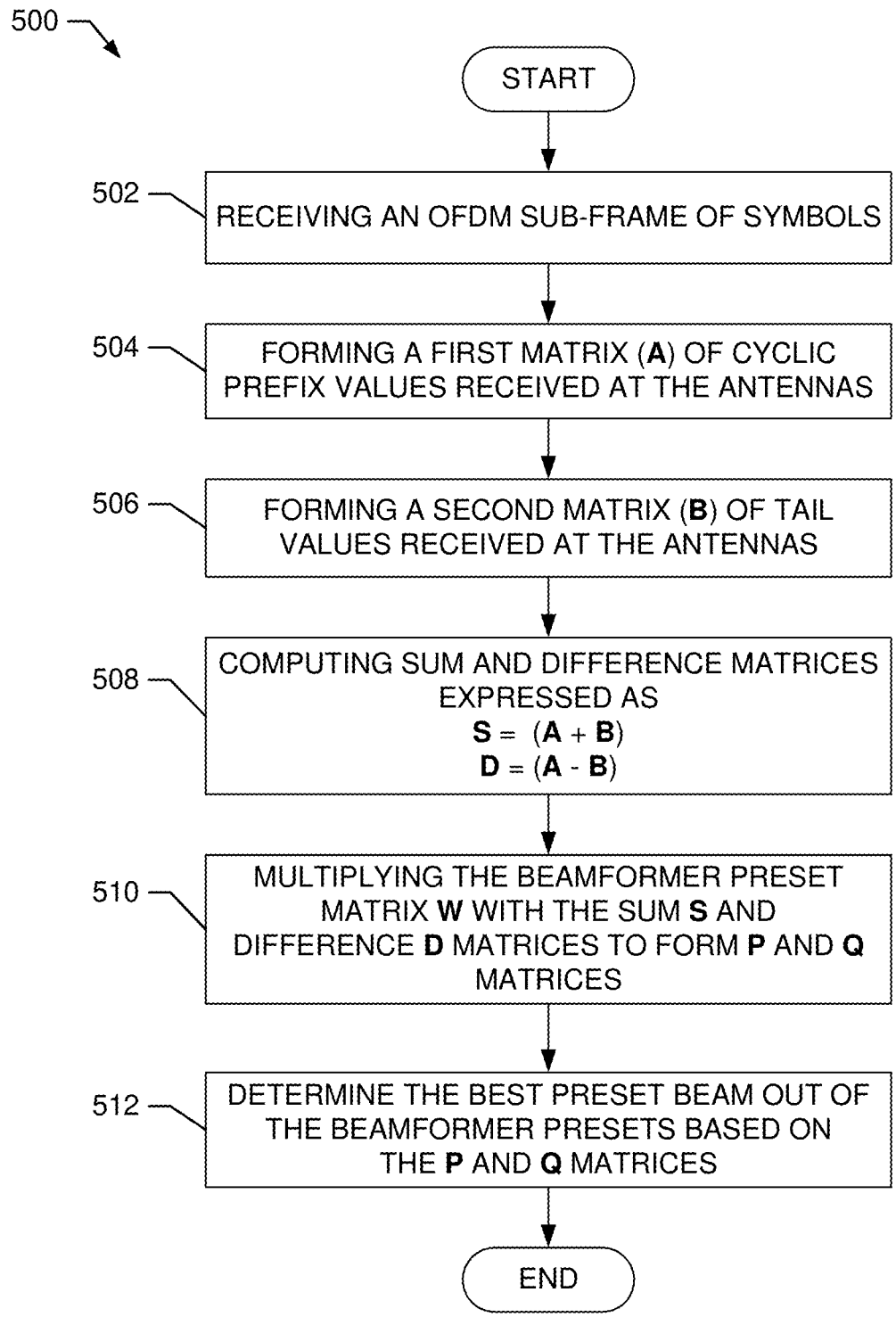
FIG. 5 show an exemplary method for performing adaptive beam selection to receive uplink transmissions in a communication system.

FIG. 5 shows an exemplary method 500 for operating an adaptive beam selector to select the optimal beam for receiving uplink transmissions. For example, the method 500 is suitable for use with the adaptive beam selector 106 shown in FIGS. 1-2.

At block 502, a received subframe of OFDM symbols are input to the adaptive beam selector. For example, the sub-frame of symbols 210 are input to the adaptive beam selector 106 and received by the symbol receiver 306, which passes the symbols to the symbol analyzer 302.

At block 505, a matrix (A) of symbol cyclic prefix values are formed from the received sub-frame of symbols. For example, the symbol analyzer 302 executes the beam selection algorithm 318 to form the matrix A.

At block 506, a matrix (B) of symbol tail values are formed from the received sub-frame symbols. The two matrices should be identical, but due to distortions or interference during transmission, the two matrices now may have different values. For example, the symbol analyzer 302 executes the beam selection algorithm 318 to form the matrix B.

At block 508, sum (S) and difference (D) matrices are computed from the A and B matrices. For example, the S and D matrices are formed from the A and B matrices as described above. For example, the symbol analyzer 302 executes the beam selection algorithm 318 to form the S and D matrices.

At block 510, a beamformer preset matrix W is multiplied by the sum S and difference D matrices to form a first matrix P represented wanted signal and a second matrix Q representing unwanted signal as described above. For example, the symbol analyzer 302 executes the beam selection algorithm 318 to form the P and Q matrices.

At block 512, the best preset beam to used is determined from the P and Q matrices. For example, the symbol analyzer 302 executes the beam selection algorithm 318 to determine the best preset beam to select as described above.

Thus, the method 500 operates to select the optimal beam for receiving uplink transmissions. It should be noted that the method 500 is illustrative and not limiting, and that that the operations of the method 500 may be rearranges, added to, deleted, or otherwise modified within the scope of the embodiments.

Figure 6:
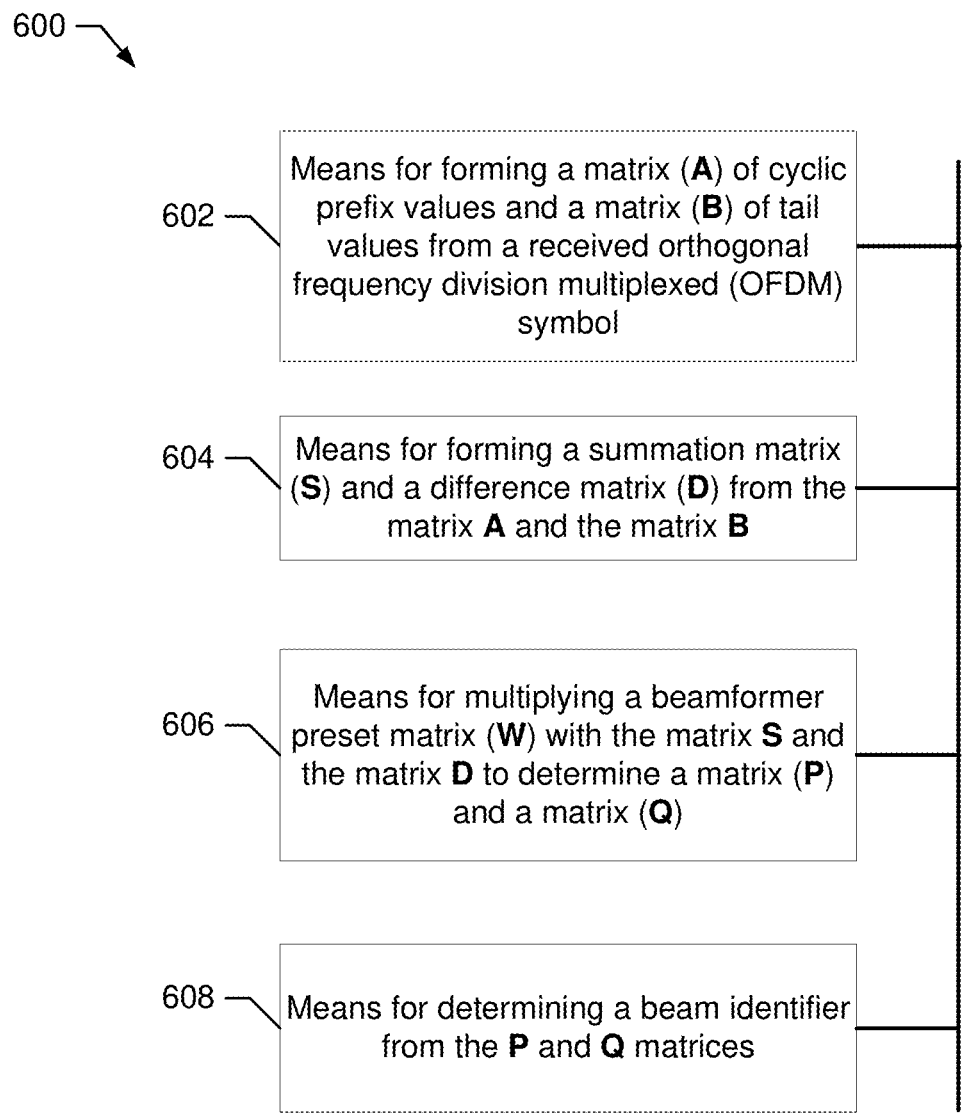
FIG. 6 shows an exemplary apparatus that performs adaptive beam selection to receive uplink transmissions in a communication system.

FIG. 6 shows an exemplary embodiment of an adaptive beam selector 600 that selects the optimal beam to receive uplink transmissions. For example, the ABS 600 is suitable for use as the ABS 106 described above.

In an embodiment, the ABS 600 comprises means 602 for forming a matrix (A) of cyclic prefix values and a matrix (B) of tail values from an orthogonal frequency division multiplexed (OFDM) symbol, which in an embodiment comprises the symbol analyzer 302 or the matrix A forming circuit 404 and the matrix B forming circuit 406. The ABS 600 also comprises means 604 forming a summation matrix (S) and a difference matrix (D) from the matrix A and the matrix B, which in an embodiment comprises the symbol analyzer 302 or the summation circuit 408 and the difference circuit 410. The ABS 600 also comprises means 606 for multiplying a beamformer preset matrix (W) with the matrix S and the matrix D to determine a wanted signal matrix (P) and an unwanted signal matrix (Q), which in an embodiment comprises the symbol analyzer 302 or the multiplying circuit 412. The ABS 600 also comprises means 608 for determining a selected beam identifier based on the wanted P and unwanted Q matrices.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for reducing signal interference via an adaptive beam selection during a network communication, comprising:
    receiving a stream of incoming signals via an uplink transmission from one or more antennas over a wireless network;
    obtaining a beam preset weight signal from an adaptive beam selector in response to sub-frame symbols;
    generating resulting signals in response to the stream of incoming signals and the beam preset weight signals; and
    forwarding the resulting signals to a sub-frame receiver to identify symbols.

2. The method of claim 1, further comprising forwarding the sub-frame symbols from the sub-frame receiver to a symbol processor of the adaptive beam selector for symbol analysis.

3. The method of claim 1, further comprising generating a preset beam identifier in accordance with the sub-frame symbols.

4. The method of claim 2, further comprising forwarding the preset beam identifier from the symbol processor to a beam pattern selector of the adaptive beam selector.

5. The method of claim 3, further comprising generating the beam preset weight signal by the beam pattern selector in response to the preset beam identifier.

6. The method of claim 1, wherein receiving a stream of incoming signals further includes receiving orthogonal frequency-division multiplexing ("OFDM") digital data transmission.

7. The method of claim 1, further comprising generating a matrix (A) of cyclic prefix values and a matrix (B) of tail values from a received orthogonal frequency division multiplexed ("OFDM") symbol.

8. The method of claim 7, further comprising forming a summation matrix (S) and a difference matrix (D) from the matrix A and the matrix B.

9. The method of claim 7, further comprising multiplying a beamformer preset matrix (W) with a summation matrix (S) and a difference matrix (D) to determine a matrix (P) and a matrix (Q).

10. The method of claim 7, further comprising determining a beam identifier from a matrix (P) and a matrix (Q).

11. An apparatus able to reduce cross-signal interference during a network communication, comprising:
    a beamformer configured to receive and process a stream of wireless signals via an uplink transmission in response to a beam preset weight;
    a sub-frame receiver coupled to the beamformer and configured to generate sub-frame symbols in accordance with the stream of wireless signals; and an adaptive beam selector coupled to the beamformer and configured to provide the beam preset weight based on a sub-frame symbol via a comparison between a cyclic prefix portion of a symbol and a tail portion of the symbol.

12. The apparatus of claim 11, wherein the adaptive beam selector includes a beam pattern selector configured to generate the beam preset weight in response to the preset beam identifier.

13. The apparatus of claim 11, wherein the adaptive beam selector includes a symbol processor capable of generating a preset beam identifier based on the sub-frame symbols.

14. The apparatus of claim 13, wherein the symbol processor includes a memory storing a beam selection algorithm for facilitating symbol analysis.

15. The apparatus of claim 13, wherein the symbol processor includes a symbol analyzer for identifying a beam pattern in response to the sub-frame symbols.

16. The apparatus of claim 13, wherein the symbol processor includes a first matrix forming circuit configured to generate a matrix of cyclic prefix values from a received orthogonal frequency division multiplexed ("OFDM") symbol.

17. The apparatus of claim 16, wherein the symbol processor includes a second matrix forming circuit configured to generate a matrix of tail values from the received orthogonal frequency division multiplexed ("OFDM") symbol.

18. The apparatus of claim 13, wherein the symbol processor includes a summation circuit configured to facilitate providing a summation matrix from a matrix of cyclic prefix values and a matrix of tail values.

19. The apparatus of claim 13, wherein the symbol processor includes a multiplying circuit configured to facilitate providing a beamformer preset matrix in response to a matrix of cyclic prefix values and a matrix of tail values.

20. A method for reducing noise interference via an adaptive beam selection during a network communication, comprising:
receiving a stream of incoming signals via an uplink transmission formatted with orthogonal frequency division multiplexing ("OFDM") from one or more antennas over a wireless network;
obtaining a beam preset weight signal indicating beam patterns based on sub-frame symbols from an adaptive beam selector; and
generating resulting signals in response to the stream of incoming signals and the beam preset weight signals.

21. The method of claim 20, further comprising forwarding the resulting signals to a sub-frame receiver to generate one or more sub-frame symbols.

22. The method of claim 21, further comprising forwarding the sub-frame symbols from the sub-frame receiver to a symbol processor of the adaptive beam selector for symbol analysis.

23. The method of claim 20, further comprising generating a preset beam identifier in accordance with the resulting signals.

24. The method of claim 23, further comprising forwarding the preset beam identifier from a symbol processor to a beam pattern selector of the adaptive beam selector.

25. The method of claim 23, further comprising generating the beam preset weight signal by the beam pattern selector in response to the preset beam identifier.

26. The method of claim 20, wherein receiving a stream of incoming signals further includes receiving orthogonal frequency-division multiplexing ("OFDM") digital data transmission.

27. The method of claim 20, further comprising generating a matrix of cyclic prefix values and a matrix of tail values from a received orthogonal frequency division multiplexed ("OFDM") symbol.

28. The method of claim 20, further comprising generating a summation matrix based on a matrix of cyclic prefix values and a matrix of tail values.

29. An apparatus for minimizing signal interference via an adaptive beam selection during a network communication comprising:
a beamformer able to receive a stream of incoming signals via an uplink transmission from one or more antennas over a wireless network; and
an adaptive beam selector coupled to the beamformer and configured to generate a beam preset weight signal in accordance with sub-frame symbols;
wherein the beamformer is capable of generating resulting signals in response to the stream of incoming signals and the beam preset weight signals and forwarding the resulting signals to a sub-frame receiver to identify symbols.

30. The apparatus of claim 29, wherein the sub-frame receiver is configured to forward the sub-frame symbols to a symbol processor of the adaptive beam selector for symbol analysis.

31. The apparatus of claim 29, wherein the adaptive beam selector includes a symbol processor configured to generate a preset beam identifier in accordance with the sub-frame symbols.

32. The apparatus of claim 31, wherein the symbol processor is capable of forwarding the preset beam identifier to a beam pattern selector of the adaptive beam selector.

33. The apparatus of claim 31, wherein the adaptive beam selector includes a beam pattern selector configured to generate the beam preset weight signal in response to the preset beam identifier.

34. An apparatus for reducing noise interference via an adaptive beam selection during a network communication comprising:
a beamformer receiving a stream of incoming signals via an uplink transmission formatted with orthogonal frequency division multiplexing ("OFDM") from one or more antennas over a wireless network;
an adaptive beam selector coupled to the beamformer and configured to generate a beam preset weight signal indicating beam patterns based on sub-frame symbols; and
wherein the beamformer is able to provide resulting signals in response to the stream of incoming signals and the beam preset weight signals.

35. The apparatus of claim 34, further comprising a sub-frame receiver coupled to the beamformer and configured to generate one or more sub-frame symbols in response to the resulting signals.

36. The apparatus of claim 34, further comprising a sub-frame receiver coupled to the beamformer and configured to forward frame symbols to a symbol processor of the adaptive beam selector for symbol analysis.

* * * * *